June 10, 1924.  V. KAPLAN  1,497,666

TURBINE ROTOR WHEEL

Filed March 14, 1923

Inventor
Victor Kaplan
By his Attorney

Patented June 10, 1924.

1,497,666

UNITED STATES PATENT OFFICE.

VICTOR KAPLAN, OF BRUNN, CZECHOSLOVAKIA.

TURBINE ROTOR WHEEL.

Application filed March 14, 1923. Serial No. 625,087.

*To all whom it may concern:*

Be it known that I, VICTOR KAPLAN, citizen of Czechoslovakia, residing at Brunn, in the county of Moravia and State of Czechoslovakia, have invented certain new and useful Improvements in Turbine Rotor Wheels, of which the following is a specification.

This invention relates to the regulation of the impeller blades of rotor wheels of water-turbines and turbine pumps and consists in the provision of means for facilitating the angular adjustment of the blades while the wheel is running.

In all regulating devices the function of which is to turn the impeller blades during the operation to adjust them for variations in the water supply, the drawback is felt, that the blades, because of the blade-load caused by the water-pressure, can be turned only by great forces. The regulating rods required thereby can be arranged therefore only with difficulty in the regulating hub. Also, the automatic regulators must be built for large regulating forces, which involves a considerable increase in the expense of the entire turbine.

Figure 1:
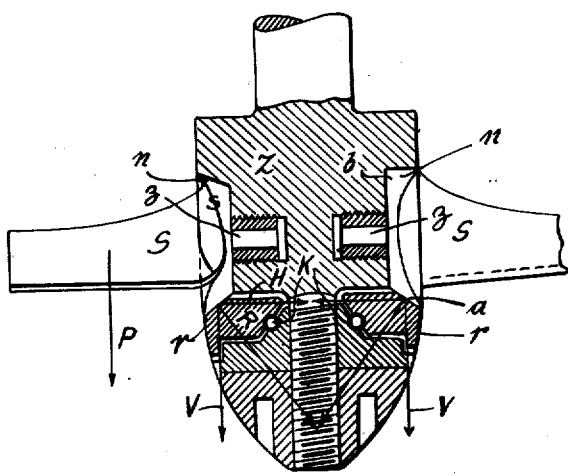
Figure 2:
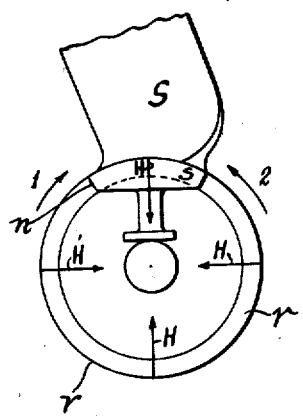

These defects can be avoided if, in accordance with the invention, at least a portion of the resistances otherwise occurring as gliding friction is converted into rolling friction. To this end, there is provided a supporting ring surrounding the regulating hub, which ring receives a portion at least of the supporting forces and by the turning of which the otherwise gliding friction is converted into rolling friction, as shall be more fully explained in connection with the accompanying drawing, in which, Fig. 1 is a sectional view of a rotor wheel hub equipped with my invention; and Fig. 2 is a diagrammatic plan view of the supporting ring of Fig. 1, showing one blade stem only.

The object of my invention is attained by the provision, in the hub Z of the rotor wheel, of a relatively rotatable supporting ring $r$, mounted in an annular groove or recess in the hub and presenting a bearing surface $n$ which contacts with the larger periphery of the stems $s$ of the blades S and coacts therewith in the manner of a friction gear, so that, when the blades are angularly adjusted, which is accomplished by any well known means, not shown, the friction of the blade stems is no longer a sliding friction on a relatively fixed hub surface, but is converted into a rolling friction on the ring surface, the ring rotating horizontally about the hub axis and being carried on ball bearings K, if desired. The coacting surfaces $n$ of the ring and blade stem are shown as conical, constituting, in effect, a pair of meshing friction bevel gears, but these coacting surfaces may be cylindrical, if desired.

The water-pressure acting on the blade indicated by the arrow P, causes forces of reaction on the bearing surfaces $n$ of which forces the force acting at the lowest point of contact of said surfaces is indicated by the arrow R. Since the blades are symmetrically arranged relative to the axis of the rotor wheel, a simple analysis of the forces will show, that the horizontal components H and R mutually balance each other and the vertical components V represent a load on the supporting ring $r$ in axial direction. This axial thrust can be received by a ball-bearing K. If therefore, the blade S is turned in the usual way, the two conical surfaces $n$ of the hub-body and of the supporting ring $r$ act as a friction gear, since the blade stem imparts to the supporting ring $r$ a turning moment. The same is also true of the other blades, so that the supporting ring will simultaneously rotate with all the blades. In Fig. 2 is indicated by the arrow 1 the direction of rotation of the ring when the blades open and by the arrow 2 the direction when the blades close. However, since the rolling friction to be overcome is only a fraction of the otherwise caused gliding friction, the regulating force required for the turning of the blades is considerably decreased, the principal resistance to be overcome being that caused by the friction of the trunnion axis $z$ of the blade.

If the conical bearing surfaces of the supporting ring and blade stems are replaced by cylindrical bearing surfaces, sliding friction at the line of contact can not be entirely prevented, but the losses in power caused thereby are of no practical importance in view of the other advantages. In this case, the supporting force occurring at the line of contact has essentially a vertical direction relative to the wheel shaft and, with symmetrically arranged blades, these forces are theoretically completely supported in the supporting ring. Due to unpreventable errors in construction a perfect balance of pressure in the supporting ring cannot be obtained, for which reason a simple journalling of the same in the regulating hub is advisable. This journalling can, of course, be still improved by the use of ball or roller bearings.

Claims:

1. Rotor wheel for turbines and the like, comprising a hub, a supporting ring rotatably journaled therein, and blades pivotally mounted in said hub for angular adjustment, said blades and ring having abutting surfaces whereby said ring receives a portion of the load on said blades and facilitates the adjustment of the latter.

2. Rotor wheel for turbines and the like, comprising a hub, a supporting ring rotatably journaled therein, blades adjustably carried by said hub and having surfaces in engagement with said ring, and roller bearings between said ring and hub.

In testimony whereof I affix my signature.

VICTOR KAPLAN.